J. L. JONES.
SEEDER.
APPLICATION FILED AUG. 10, 1908.
1,083,746.
Patented Jan. 6, 1914.
4 SHEETS—SHEET 4.
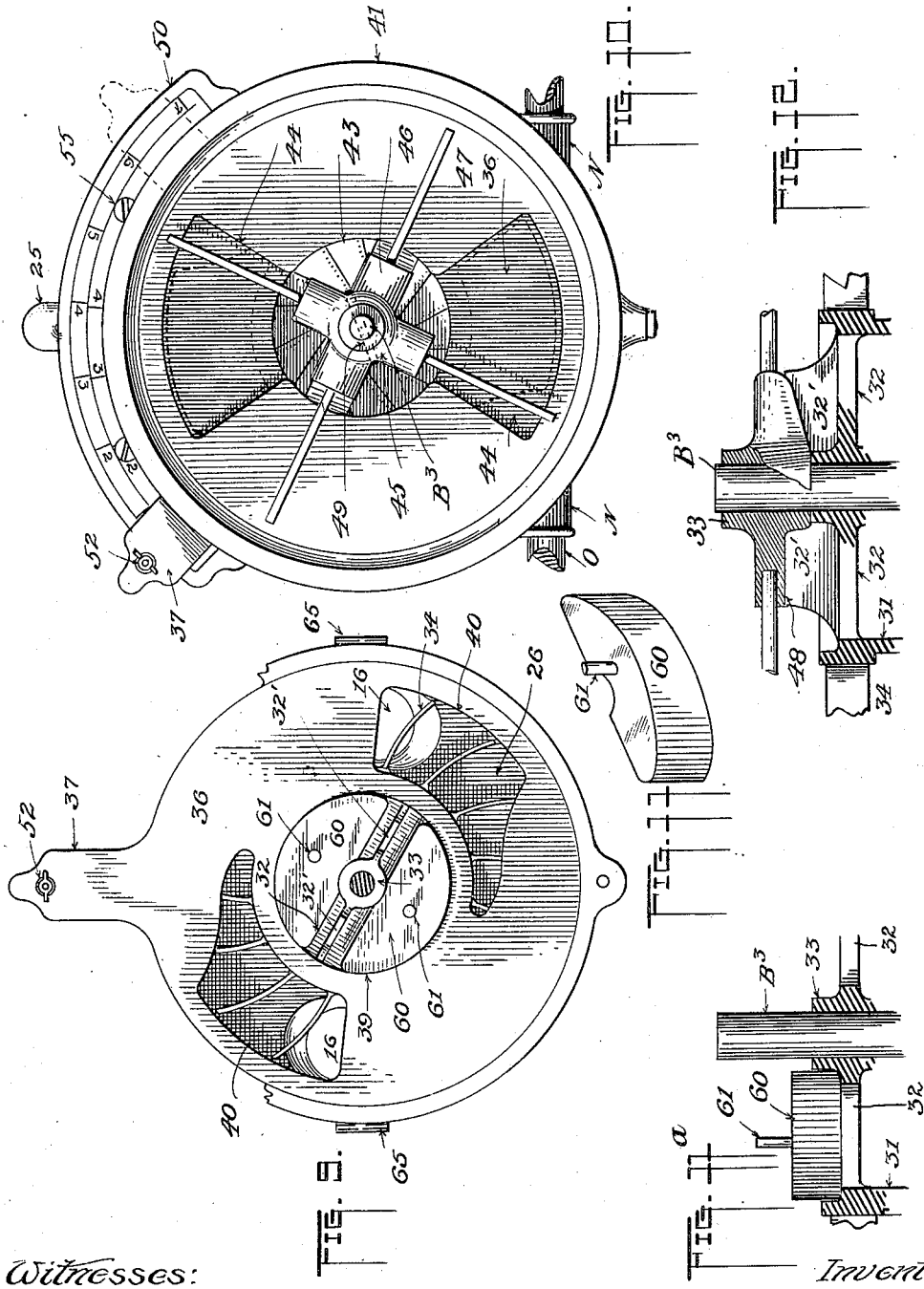
Witnesses:
Maude Hiller.
Maggie Smith
Inventor
John L. Jones
By L. M. Thurlow
Atty.

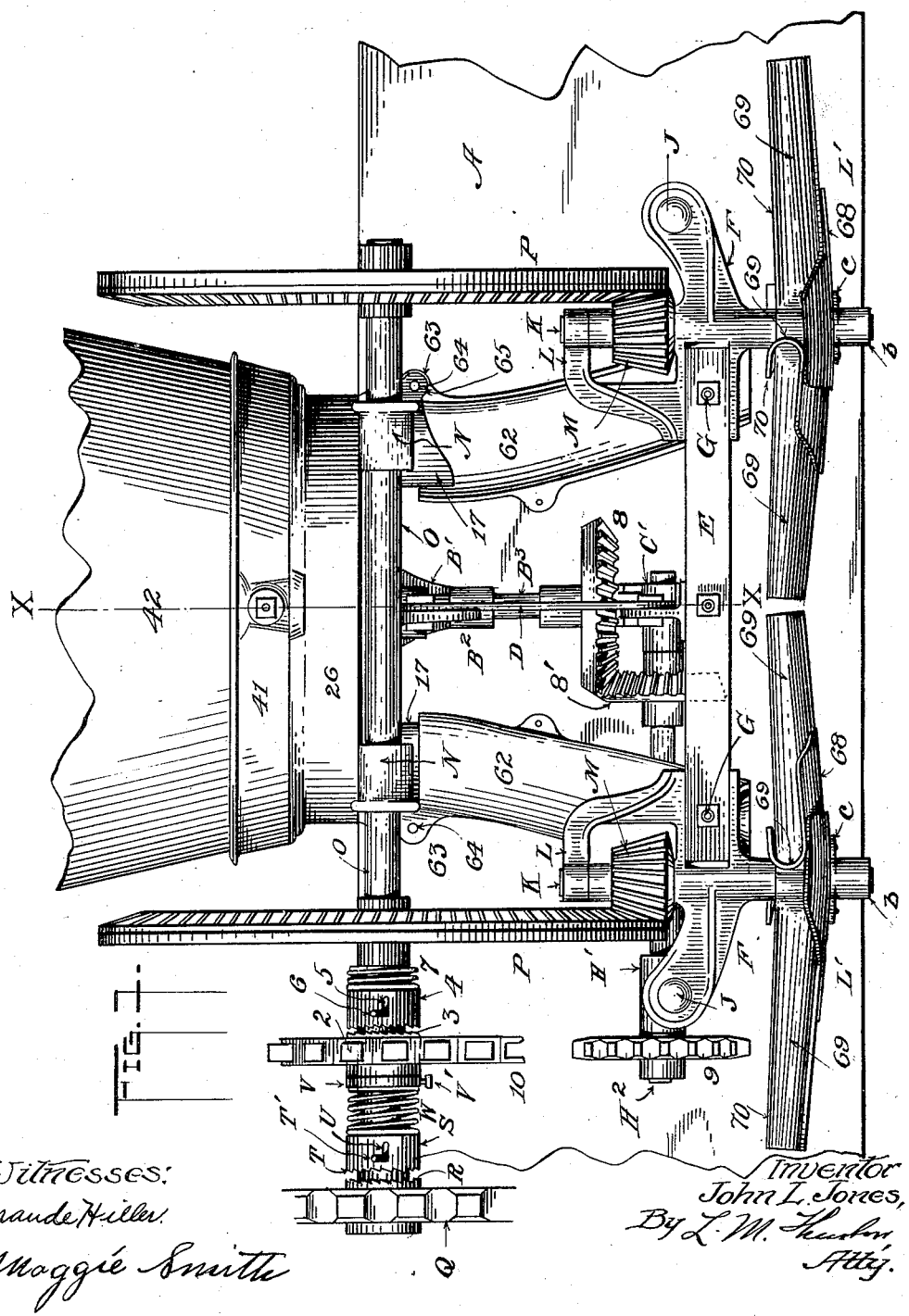

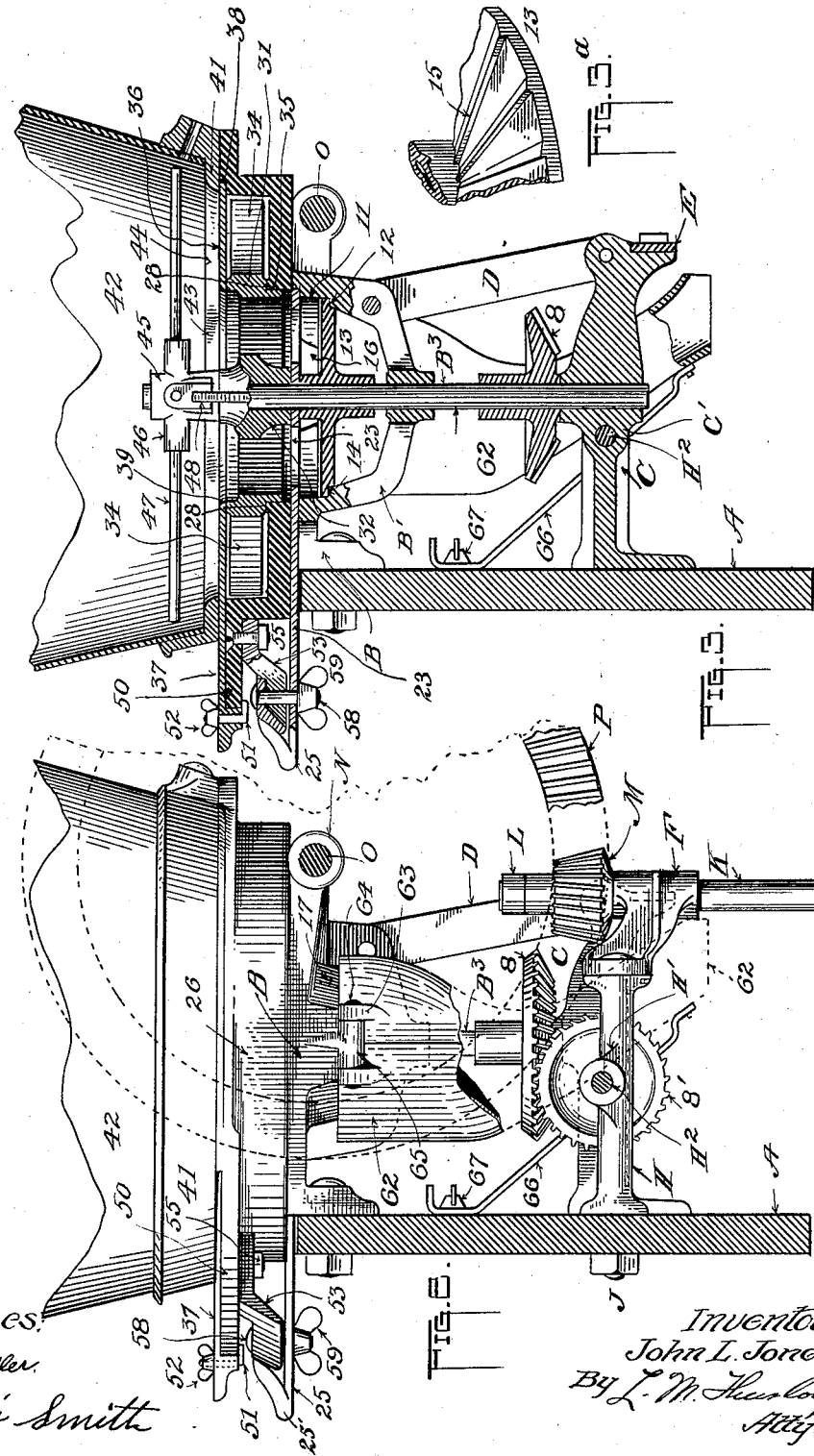

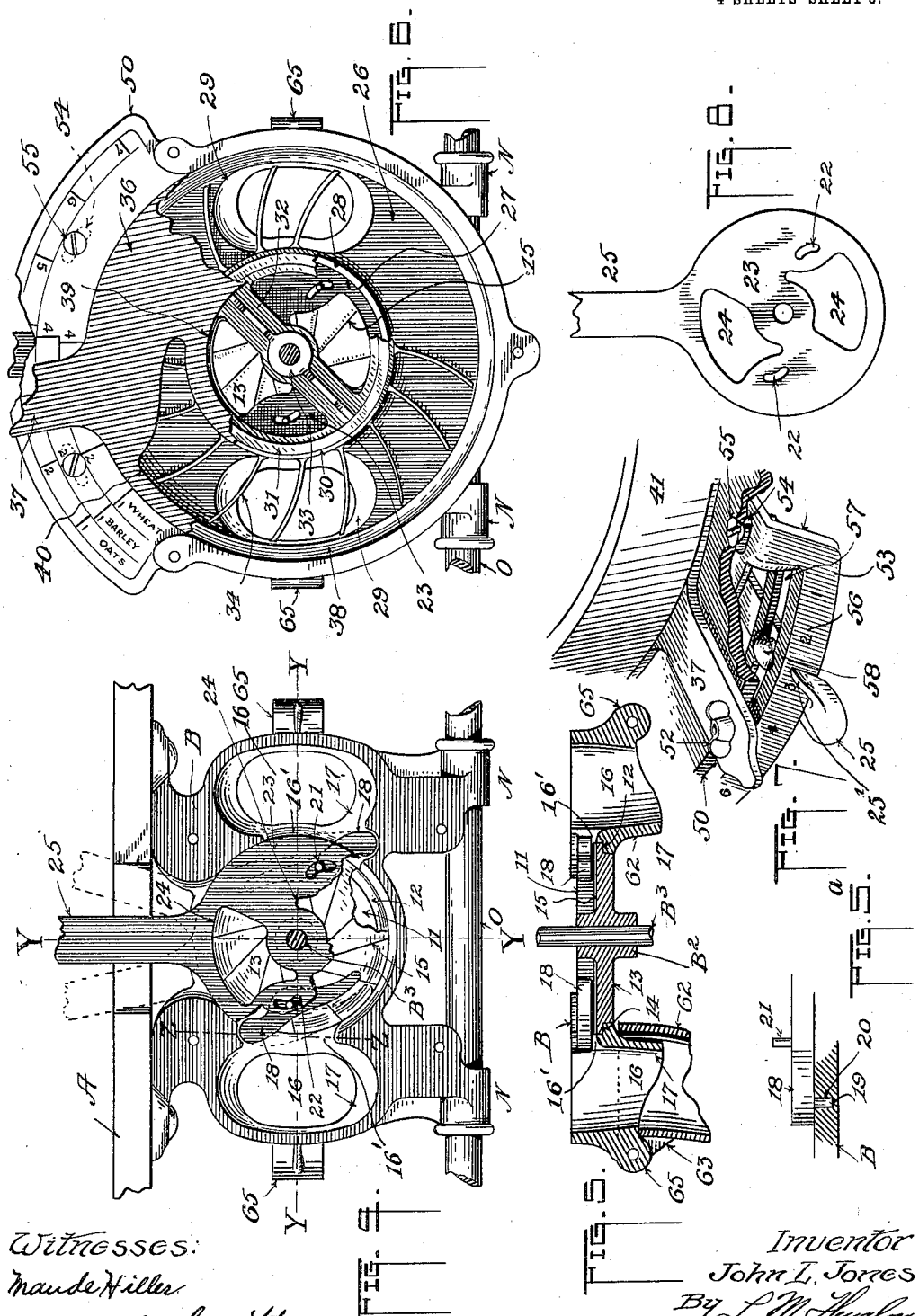

UNITED STATES PATENT OFFICE.

JOHN L. JONES, OF PEORIA, ILLINOIS.

SEEDER.

1,083,746.  Specification of Letters Patent.  Patented Jan. 6, 1914.

Application filed August 10, 1908.  Serial No. 447,706.

*To all whom it may concern:*

Be it known that I, JOHN L. JONES, citizen of the United States, residing at Peoria, in the county of Peoria and State of Illinois, have invented certain new and useful Improvements in Seeders; and I do hereby declare that the following is a full, clear, and exact description of the invention, which will enable others skilled in the art to which it appertains to make and use the same.

This invention has reference to seeding machines and has for an object the provision of an improved form of seed-feeding devices for use in all forms of seeding machines but particularly a seeder of the end-gate type.

A further object is to provide a new form of seed distributing devices applicable to seeders of the end-gate or broad-cast type.

A further object is to provide seed distributing devices, for both grass-seed and grains, adapted to travel in a horizontal plane instead of revolving upon a horizontal axis as in some of the older forms of these devices.

A further object is to provide peculiarly constructed seed distributing mechanism revoluble in a horizontal plane adapted for sowing all kinds of small grains and grass-seed.

A further object is to provide a seeding mechanism for the small grains and grass-seed operated from a common driving-shaft and delivered from a single hopper.

It is also my purpose to place the discharge openings from the hopper which lead to the usual seed spouts at substantially diametrically opposite sides of the hopper so that the seed will be more readily, quickly and evenly discharged than through a single opening in the hopper as commonly employed. I am enabled by widely separating the spouts to place them more nearly vertical so as to in effect actually drop the grain upon the fans or distributers the advantage of which is obvious. Furthermore a wider range of adjustment is possible than when the spouts diverge from a single opening.

Other objects will appear in the following specification and besides these objects the invention relates to certain details of construction and arrangements of parts as will be pointed out herein and form the subject matter of certain of the claims.

In the drawings: Figure 1 is a front elevation of a seeder of the end-gate type showing certain of my improvements embodied therein. Fig. 2 is a side elevation with parts removed. Fig. 3 is a transverse sectional elevation of the same on line $x\ x$ Fig. 1. Fig. 3$^a$ is a perspective view of a portion of a grass-seed discharge plate. Fig. 4 is a plan of a supporting frame of the seeder showing grass-seeding mechanism. Fig. 5 is a sectional elevation of the same on line $y\ y$ Fig. 4. Fig. 5$^a$ is an elevation of part of the seeder frame in section and a grass-seed cut-off taken on line $z\ z$ Fig. 4. Fig. 6 is a plan of a part of that shown in Fig. 4 with other parts mounted thereon. Fig. 7 is a perspective view of a part of the seeding machine showing means for adjusting certain members which govern the amount of grass-seed or grain delivered to the fans. Fig. 8 is a plan of a plate for operating certain cut-off members which govern the delivery of grass-seed. Fig. 9 is a plan of parts illustrated in Fig. 6 showing a complete cut-off plate or valve. Fig. 10 is also a plan showing parts illustrated in Fig. 9 and added members including an agitator. Fig. 11 is a perspective view of a member for closing one of the openings leading from the hopper to the grass-seed delivery plate. Fig. 11$^a$ is a sectional elevation of part of a seed-feeding wheel with the member shown in Fig. 11 in connection therewith. Fig. 12 is a detail showing parts of a seed-agitator and seed-feeding wheel.

The reference letter A indicates the end-gate usually provided as a support for seeding machines of the type illustrated, near the top of which is attached a cast frame indicated at B clearly shown in Fig. 4. Attached also in any suitable manner to the end-gate near the bottom, is a second cast frame C, these two frames being connected by a member D, which together with the end-gate, firmly braces both said frames. Attached at the middle of its length to the outer end of the lower frame C is a bar E, Figs. 1 and 3 which lies parallel to the end-gate and to each end of which a casting F is attached as by means of bolts G. Interposed between each frame F and the end-gate is a spool or sleeve H there being one shown in Fig. 2, the said spool and the casting F being rigidly secured to the end-gate as by means of bolts J, Figs. 1 and 2.

K K represents two vertical shafts each provided with a fan and each having its bearing in the casting F and in the extremity also of an arm L of said casting as clearly shown in Fig. 1.

The upper frame or casting B has a depending yoke B', Fig. 3, and in the said frame is a central bore indicated at 11 up through which extends a shaft $B^3$ driven from any suitable source, there being a shoulder 12 to receive a grass-seed delivery plate 13, secured in any suitable manner to the shaft and consequently revoluble therewith and provided with an annular shoulder 14 to rest seed-tight upon said shoulder 12, the plate being allowed to freely turn thereon. This however is a preferred construction and any other manner of fitting the member may be employed. The surface of the plate as shown in Fig. $3^a$ and in Fig. 6 is provided with a series of raised ribs 15 which preferably have vertical faces for moving the grass-seed toward the discharge openings, said ribs being preferably beveled rearwardly away from said faces. Through the casting B at each side of the bore 11 is a vertical discharge opening 16 preferably horizontally elongated substantially as shown in Fig. 4. These openings 16 extend into short depending spouts 17 forming part of said casting B as clearly shown in cross-section in Fig. 5 and into these openings it is designed that the grains or grass-seed be delivered to finally reach the fans.

Resting upon the upper surfaces of the plate 13 or rather upon the ribs 15 substantially diametrically opposite one another are two cut-offs 18, one end of each being provided on its under surface with a pin 19 as shown in Fig. $5^a$ adapted to seat in holes 20 of the casting B to constitute pivots for said cut-offs, the free ends of the latter being adapted to move substantially radially upon the plate 13. Extending upward from the top surface of each cut-off is a pin 21 which extends through a slot 22 in a circular plate 23 resting in a seat of similar form in the casting B, the upper surface of said plate above the said bore 11 being preferably substantially flush with the top surface of said casting. The slots 22 are so disposed that as the plate carrying them is shifted from side to side to the positions indicated by broken line in Fig. 4, the pins 21 will carry the cut-offs across the plate as described. It will be noted that in the figure last referred to the pivoted ends of the cut-offs lie close to the opening 16 and it will be noted also that these openings have communication with that part of the machine containing the seed plate 13 through opening 16' in the opposite walls of the said casting B and when the cut-offs are moved outward to the position shown in broken lines, said openings 16' will be entirely closed these members constituting a wall substantially the same height as the walls of the casting in which is the bore 11. When the plate 23 is shifted toward the left, the cut-offs will be moved to close the openings 16' leading from the upper surface of the plate 13 into the receiving openings 16 and in this connection attention is called to Fig. 3 wherein the cut-offs are not shown and in which one of the openings 16' is there illustrated as an unobstructed passage. In the figures the ribs 15 of the grass-seed plate 13 are shown tangential to its hub so that as said plate turns the ribs will be drawn beneath the cut-offs in a shearing manner, relative to their outer surfaces in order to effect a discharge of the seed without injuring it as would more likely result were the ribs set radially. The plate 23 is provided with two openings 24 (see Fig. 8) through which the grass-seed falls upon the plate 13, and movement is imparted to said plate 23 through an extension or arm 25 thereof.

In Fig. 6 the parts just described are surmounted by a grain cup 26 having a central bore 27, corresponding in diameter to substantially that of plate 23, and adjacent to said bore is an annular raised rim 28, said cup virtually constituting the bottom of the hopper and having two openings 29 in its bottom to register with the openings 16 in the member B. I next provide a seed-feeding wheel indicated by 30 comprising a central rim 31 which lies in said bore 27, a central cross arm, and hub 32 and 33 respectively, and a series of spaced curved arms or teeth 34 clearly shown in Fig. 6, their concave surfaces facing in the direction in which the wheel is to revolve. Preferably the rim 31 is provided with an annular groove 35 at its bottom to permit said rim to fit into the bore 27 of the said seed cup 26 to form a snug working joint and a joint through which the seed cannot work. The teeth 34 are raised slightly above the bottom of the grain cup so that they cannot injure the grain by a shearing or grinding action. The rim 31 extends slightly above the line of the teeth 34 and upon this rests a cut-off plate or valve 36 having an extended arm 37 by which it may be shifted. The upper portion of the said grain cup is counter-bored at 38 to receive the said cut-off plate or valve 36 so that the upper surface of the latter will be flush with the top surface of its rim (see Fig. 3). The valve is provided with a central opening 39 communicating with the central bore of the seed-feeding wheel and also with two other seed openings 40. Lying above the valve 36 and resting upon the rim of the seed-feeding wheel is a hopper bottom 41 for carrying the hopper 42. Fig. 10 shows this hopper bottom or ring and the form of openings in its bottom and beneath which the valve 36 is shown.

It is provided with a central opening 43 corresponding in size to that of the central opening 39.

44 are two diametrically opposite segmental openings with which the openings 40 of the valve are designed to register (see Figs. 9 and 10).

On the upper end of the shaft $B^3$ is an agitator comprising a central casting 45 having a series of arms 46 provided with fingers or arms 47. Two of these diametrically opposite arms have a notch 48 to receive lugs 32' of the central arm 32 of the seed-feeding wheel. In Fig. 10 I show a pin 49 extending through the hub 33 and the shaft $B^3$. The shaft in its revolution drives the agitator and the last named member imparts movement to the seed-feeding wheel by engaging the lugs 32'. When the valve 36 is thrown to the left as shown in full lines in Fig. 10 the segmental openings 44 are closed so that the contents of the hopper cannot pass into the grain cup 26 to the seed-feeding-wheel 30. When the valve is thrown to the extreme right, the said openings 44 are wide open so that the grain can pass through them.

I employ means for fixing the plate 23 and the valve 36 in any desired position. An extension 50 is cast with the cup 26 at the rear and upon this the extension 37 of the valve slides. I have indicated three concentric spaces on said extension 50 which are divided into several parts or divisions at any one of which the valve may be set to provide for the delivery of an amount of grain corresponding to the measurements shown. The outer space is marked "Oats," the adjoining space is marked "Barley," and the innermost or third space is marked "Wheat." By this means the operator is enabled to deliver any desired quantity of any one of these grains by fixing the valve at the proper mark and thus provide an opening of the proper area. In the extension 37 is an L-shaped member 51 Figs. 2 and 3 whose lower end is adapted to engage the under surface of the extension 50 and a thumb-nut 52 engages the upper threaded end of said member and serves to lock the parts relatively. The means to lock the plate 23 includes a casting 53 bolted to the under surface of the extension 50 just described, said casting having slots 54, Fig. 6, one of which is shown in Fig. 7, and through these slots bolts 55 extend. Said bolts provide for an adjustment of the casting longitudinally upon the extension 50 by which certain indicating figures 56 on the casting can be properly placed so that the cut-offs 18 can be set by the plate 23 for a given amount of grass-seed to be discharged from the plate 13. The casting 53 lies just above the extension 25 of the plate 23 and said extension 25 carries an upwardly extending finger as an indicator for the figures 56 of the casting. A slot 57 in the casting 53 receives a bolt 58 carried by the extension 25 and a thumb-nut 59 on the lower end of the bolt is provided to set the indicator at the point described. Since the grass-seed and the grain are delivered separately from the same receptacle 42 it is necessary in my form of seeder to provide means for covering or exposing one or the other of the seeding devices 13, 34 supplied therefrom according to needs.

I have already described the valve 36 by which openings, leading to the seed feeding wheel 30 can be entirely closed as when it is desired to sow grass-seed. In order to close the entrance of the grass-seed delivery plate 13 when sowing grain I show in Figs. 9, 11 and 11$^a$ the members 60 of a form that can be seated in the openings in the center of the seed-feeding-wheel 30 to form closures for the latter. These rest upon the cross arms 32 and the inwardly extending annular rim of the seed feeding-wheel as shown in Fig. 11$^a$ last referred to. This entirely closes the openings so that grain cannot descend upon the grass-seed plate 13. The members 60 are provided with convenient means at 61 by which they can be readily and easily handled.

I provide two fan spouts indicated at 62 and these are provided at their tops with ears 63 which, by means of pins 64 are pivotally suspended from lugs 65 cast with the frame B. The upper end of said spouts inclose the depending short spouts 17 and their lower ends are suspended just above the fans and are adapted to be shifted radially with regard to the latter so that as in other devices of this kind the grain can be delivered at various points on said fans to obtain the best results.

In Figs. 2 and 3 I have indicated at 66 a shifting device comprising an arm suitably pivoted to the lower end of one of the spouts, its upper end being secured to the end-gate, for instance as by means of a thumb-nut 67 but I shall not go further into detail as to this shifting device since it is well known in the art.

The horizontal revoluble seed feeding devices illustrated and described are applicable to any kind of seeder whether of the broad cast end-gate type or to the common form of seeder. The advantage in seeding devices of this character is that by revolving in a horizontal plane the seed can be delivered through two or more separate discharge openings. Ordinarily the grain is discharged into one opening and the flow is then divided into two parts by means of a dividing wall or other device. By my devices I can govern the amount delivered upon each fan as I choose, that is to say, both fans can be made to deliver the same amount of seed or unequal amounts purposely according to the direction from which the wind is blowing or the force of the same. The grass-seed plate 13 gives the same advantage as the wheel 30 in that it also discharges into two separate openings and these openings are preferably common to both the grain and grass-seed delivery members.

In many machines two hoppers are employed one for the grass-seed and one for the grain and this necessitates many extra members and a complicated arrangement of parts. In my machine however, the single feed receiver 42 is common to both the grass seed hopper above the plate 23 and the grain cup 26 and it is only necessary to close the openings to one of the latter when the other is in use.

The hopper in reality extends entirely to the bottom of the grain cup 26 the latter constituting the bottom of the said hopper the hopper bottom 41 creating a partition and being provided in order to make use of the valve 36 to govern the grain entering the seed feeding wheel. The hopper also, as a matter of fact, extends at the center entirely down to the grass-seed plate 13 when grass-seed is to be sown the members 60 described, for closing the central openings, being employed only when necessary. The grass-seed is discharged from the seed-plate 13 behind the cut-offs 18 and in order that the seed will not be damaged between them and the vertical faces of the ribs 15 the latter are of a height that will equal the thickness of the seed so that in the revolution of the plate the seeds carried under are merely brushed aside without being cut or sheared.

My improved seeder is distinguished by its use of two separate seed receiving recesses within the hopper each being provided with a separate closure and communicating with a common discharge opening or openings leading to the distributer or fan and the hopper can thus be used for grain or for grass-seed distribution by closing one or the other of the recesses by means of the closure provided therefor and both kinds of seed are delivered to the distributer through the same channel or channels according to whether one or two distributers are employed. The discharge openings for the seed are not located so as to discharge by gravity directly from the hopper, but by preference are arranged so that both the grain and grass-seed are positively discharged thereto by the seed feeding members 13 and 30.

In order that the operation of seeding will be clearly understood the following is to be observed:—When the members 60 are put in position with the openings 40 and 29 free for the passage of the seed to be planted, the hopper or receptacle when supplied with grain can deposit it into the spouts 62 it being clear by a study of Fig. 6 that if the openings through which the plate 13 is observed is closed by said members 60 the grain will be deposited through the opening 40 into the seed cup 26 when it will be swept by the teeth 34 into the openings 29 and thence into the spouts 62 upon the fans. If, however, the openings 40 and 29 are closed by covering the openings 44 of the hopper bottom 41 with the plate 36 then grass seed with which the hopper or receptacle 42 can be filled will be deposited upon the plate 13 through the openings beneath the members 60, after the latter are removed, which will be ejected through the openings 16' and 16 into the spouts 62. But as grain and grass seed are sometimes sown together they may, if desired, be mixed and delivered from the hopper 42 through the openings 40 as before, the members 60 being then put in place. It is seen, therefore, that either grain or the grass seed is sown separately from the hopper 42 through separate mechanism suitable in size and structure to accommodate and properly deliver them, or that both may be sown together through the path usually employed for the sowing of the grain alone. The only containing hopper for the grain or the grass seed is the member 42 and the seed cup 26 and the grass seed hopper, so called, constituted by the wheel-rim 31 are merely aids thereto and these are virtually parts of the member 42 when exposed and receive seed therefrom, so that said member 42 practically has two separate compartments usable separately at will.

Having thus described my invention, I claim:—

1. In a seeding machine the combination of a hopper, a seed compartment beneath it having a central opening in the bottom and an outer opening, a diaphragm separating the hopper and said compartment, and provided with a central and an outer opening, a seed-feeding wheel in said compartment, means to close the outer diaphragm-opening to the latter, there being included in the structure a conduit connecting the two central openings, and means to close one of the said central openings.

2. In a seeding machine the combination of a hopper, a seed compartment beneath it having a central opening in its bottom and an outer opening, a diaphragm separating the hopper and said compartment and provided with a central and an outer opening, a seed-feeding wheel in said compartment, means to close the outer diaphragm-opening, there being included in the structure a conduit connecting the central openings of the diaphragm and the compartment and extending through the latter, a seed-plate beneath the central opening of the compartment and seated in an extension of the latter there being an opening above the seed-plate in the side wall of said extension between said plate and the bottom of the said compartment.

3. The combination of a hopper, a receptacle beneath said hopper, a dividing diaphragm separating the hopper and said receptacle and provided with a central opening, and having a second opening outward from the central one, and a valve to close the said second opening.

4. The combination of a hopper, a receptacle beneath said hopper, a dividing diaphragm separating the hopper and the receptacle and provided with a central opening, and having a second opening outward from said central one, means to regulate the size of the outer opening, and means to close the said central one.

5. The combination of an open hopper, a receptacle beneath the same having a discharge opening in its bottom, a dividing diaphragm between the hopper and the receptacle and provided with a central opening beneath that of the diaphragm, and an opening outward therefrom, a seed feeding wheel rotatable in said receptacle beneath the second described opening and including an annular rim dividing the receptacle into a central and an annular chamber separate from one another, there being a discharge opening in the bottom of the annular chamber beneath the diaphragm, and a valve in control of the outer opening of the said diaphragm.

6. The combination of a hopper, a receptacle beneath and communicating with the same provided with a central opening in its bottom, a seed plate beneath said opening, a diaphragm between the hopper and said receptacle and provided with an opening disposed centrally of the hopper and provided with a second opening outward from the first, a rotating horizontally disposed seed feeding wheel seated in the receptacle and adapted to rotate beneath the said second opening, said wheel including an annular rim seated in the bottom of the receptacle and extending up to near the central opening of the diaphragm and substantially of the same diameter as said opening, and a valve in control of the second opening.

7. The combination of an open hopper, a receptacle beneath and supporting the same having a central opening in its bottom for the discharge of seed, a seed feeding wheel in the receptacle rotated upon a vertical axis and provided with an annular rim seated in the opening of the receptacle, and dividing the latter into two separate compartments, and a diaphragm separating the hopper from the receptacle and provided with an opening communicating with the outer of the compartments, there being a discharge opening leading from the bottom of said receptacle.

8. The combination of an open hopper, a receptacle beneath the same provided with a central opening in its bottom, and a second opening in said bottom inward from said central opening, a seed-feeding wheel rotatable in the receptacle on a vertical axis and having an annular rim constituting a wall surrounding the said central opening, a dividing diaphragm between the receptacle and the hopper provided with a central opening and having a second opening in communication with the receptacle outside the rim of the said wheel, and a valve in control of the said second opening.

9. The combination of an open hopper, a receptacle beneath it having a central opening in its bottom, a diaphragm separating the hopper from the receptacle and having a central opening and also having an opening between its outer periphery and the said central opening, a seed-feeding wheel rotatable on a vertical axis within the receptacle, and provided with an annular flange seated in the central opening of the receptacle and constituting a passage from the central opening of the diaphragm through the receptacle to the central opening of the same, a valve in control of the other opening of the diaphragm, and an opening in the bottom of the receptacle beneath said diaphragm.

10. The combination of an open hopper, a receptacle beneath it having a central opening in its bottom, a seed plate beneath said opening, a seed-feeding wheel rotatable on a vertical axis in said receptacle and having an annular rim adapted to register with said opening, a dividing diaphragm separating the hopper and the receptacle, and having a central opening in register with the wheel rim, and provided also with an opening above the receptacle, a valve in control of the last named opening, and a driving shaft common to the seed plate and seed-feeding wheel.

11. The combination of an open hopper provided in its bottom with a diaphragm having a central opening and a second opening adjacent thereto, a receptacle beneath the diaphragm and having in its bottom a central opening and having a discharge opening therein at two substantially diametrically opposite sides of the central one, a seed-plate beneath said central opening, a horizontally rotatable seed-feeding wheel in the receptacle provided with an annular rim forming a conduit from the hopper through the receptacle to the seed-plate, a seed distributing fan beneath each of the discharge openings of the receptacle, and a seed tube communicating with each of the last named openings, and overhanging one of the two fans, and each also communicating with the central opening of the receptacle.

12. The combination of an open hopper provided in its bottom with a diaphragm having a central opening and a second opening adjacent thereto, a receptacle beneath the diaphragm and having in its bottom a central opening and having a discharge opening therein at two substantially diametrically opposite sides of the central one, a seed-plate beneath said central opening, a horizontally rotatable seed-feeding wheel in the receptacle provided with an annular rim forming a conduit from the hopper through the receptacle to the seed-plate, a seed distributing fan beneath each of the discharge openings of the receptacle, a seed tube communicating with each of the last named openings, and overhanging one of the two fans, and each also communicating with the central opening of the receptacle, and a member interposed between the central opening and the seed tubes.

13. The combination of an open hopper provided in its bottom with a diaphragm having a central opening and a second opening adjacent thereto, a receptacle beneath the diaphragm and having in its bottom a central opening and having a discharge opening therein at two substantially diametrically opposite sides of the central one, a seed-plate beneath said central opening, a horizontally rotatable seed-feeding wheel in the receptacle provided with an annular rim forming a conduit from the hopper through the receptacle to the seed-plate, a seed distributing fan beneath each of the discharge openings of the receptacle, a seed tube communicating with each of the last named openings, and overhanging one of the two fans, and each also communicating with the central opening of the receptacle, and a valve in control of the second opening of the diaphragm.

14. The combination of an open hopper provided in its bottom with a diaphragm having a central opening and a second opening adjacent thereto, a receptacle beneath the diaphragm and having in its bottom a central opening and having a discharge opening therein at two substantially diametrically opposite sides of the central one, a seed-plate beneath said central opening, a horizontally rotatable seed-feeding wheel in the receptacle provided with an annular rim forming a conduit from the hopper through the receptacle to the seed-plate, a seed distributing fan beneath each of the discharge openings of the receptacle, a seed tube communicating with each of the last named openings, and overhanging one of the two fans, and each also communicating with the central opening of the receptacle, a valve in control of the second opening of the diaphragm, and a member interposed between the central opening and the seed tubes.

15. The combination of a hopper having a central opening at its bottom, and an opening adjacent to it, a receptacle beneath the hopper, having a central opening in its bottom and having a second opening adjacent to said central one, a seed-feeding wheel in said receptacle, including an annular rim forming a conduit from the hopper through the receptacle, a valve to control the second opening of the diaphragm, means to close the central opening of the latter, and a seed-plate in the central opening of the receptacle below its bottom, there being a discharge opening between the said seed-plate and the said bottom.

16. In a seeder the combination of a seed compartment, having a central opening and an outer opening in its bottom, a seeding device revoluble on a vertical axis within said compartment and adapted to carry the seed to the said opening, said device having a hollow hub in the form of the said outer opening and having an annular rim or hub within said compartment separating the openings from one another and forming a passage for seed to the central one.

17. In a seeding machine the combination of a hopper having two separate compartments, one of them having a discharge outlet, the other compartment being in communication with said outlet, a closure for the compartment having said opening, a seed feeding device for said compartment, a revoluble seed feeding device in the other of the compartments, the same comprising a plate having a series of raised ribs upon its upper seed receiving face extending from near its middle to its periphery, means overlying said ribs and adjustable upon the plate to govern the discharge of the seed, a closure for each compartment, and a shaft to impart motion to both devices.

18. In a seeding machine the combination of a hopper having two separate compartments, one of them having a discharge outlet, the other compartment having communication therewith, a closure for the compartment having said outlet, said closure having an opening therein, a valve to control the opening, a revoluble seed feeding device for said compartment, a revoluble seed feeding device in the other compartment comprising a plate to receive seed from the hopper and provided with a series of ribs extending up therefrom and extending from near its center of revolution toward its peripheral edge, a member overlying said ribs and pivoted upon a portion of the machine adjacent to the discharge outlet, means to shift the member across the face of the plate, and a closure for the compartment having said plate.

19. In a seeding machine, a hopper having a discharge outlet, a seed feeding plate mounted on a vertical axis and having its peripheral edge adjacent to said outlet, and having a series of ribs extending up from the upper side of the plate and extending from near the center of revolution of said plate toward its edge, a member pivoted to the hopper and having a portion thereof overlying said ribs, and means to shift the member for the purposes set forth.

In testimony whereof I affix my signature, in presence of two witnesses.

JOHN L. JONES.

Witnesses:
E. J. ABERSOL,
L. M. THURLOW.

Copies of this patent may be obtained for five cents each, by addressing the "Commissioner of Patents, Washington, D. C."